Nov. 26, 1929.   A. J. SCHWARTZ   1,737,521
EYEGLASSES
Filed Feb. 4, 1927
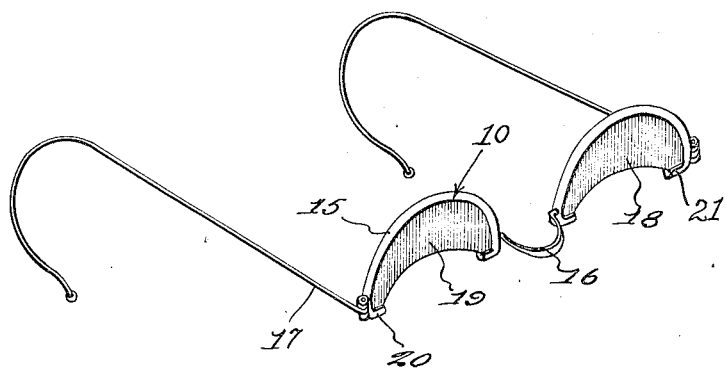
Alfred J. Schwartz INVENTOR Patented Nov. 26, 1929

1,737,521

UNITED STATES PATENT OFFICE

ALFRED J. SCHWARTZ, OF DETROIT, MICHIGAN

EYEGLASSES

Application filed February 4, 1927. Serial No. 165,910.

This invention relates to eye glasses for use by motorists while driving at night to prevent impairment of vision by the glaring effect of head lights upon approaching vehicles.

Another object of the invention comprehends means disposed above the usual line of vision which are called into active use when the head is tilted or ducked to direct the line of vision therethrough.

With the above and other objects in view the invention further consists of the following novel features and details of construction to be hereinafter more fully described, illustrated in the accompanying drawing and pointed out in the appended claim.

The illustration is a perspective view of my invention.

Referring to the drawing in detail, wherein like characters of reference denote corresponding parts, the reference character 10 indicates generally eye glass frames or rims.

In carrying out my invention I provide semi-circular lens rims 15 relatively associated by a bridge or nose-piece 16. Temple pieces 17 are carried by the rim members 15. Arcuate shaped lens members 18 are carried by the rim members 15 and which are provided with concave lower edges 19 to prevent interfering with the usual line of vision. Inwardly offset portions 20 upon the ends of the rim members 15 engage the end portions of the lens members 18 to prevent the latter from becoming displaced. Said inwardly offset portions, after the manner of the inner sides of the rim members 15, are provided with communicating channel portions 21 to accommodate the upper curved portions and lower straight portions of the lens members 18.

The invention is primarily designed for use by motorists not ordinarily affected by any abnormal condition of the eyes hence the lower portion of the conventional form of lens is discarded.

In the usual operation of the invention a line of vision is ordinarily directed through either the lens 13 or below the concaved portions 19 of the lens members 18 and upon approaching a vehicle traveling in an opposite direction and burning bright head lamps the head is slightly tilted forward to direct the line of vision through the portions 14 or the lens members 18. The glaring effect of the head lights will accordingly be softened and the motorist will be enabled to see and keep his car upon the road-way.

The invention is susceptible of various changes in its form, proportions and minor details of construction and the right is herein reserved to make such changes as properly fall within the scope of the appended claim.

Having thus described the invention, what is claimed is:

An anti-glare device comprising semi-circular spectacle frames, offset portions inwardly directed from the ends of the frames, said portions having channels within the upper sides thereof, lens members of translucent composition carried by the frames being provided with arcuate-shaped lower portions spaced from the ends thereof, shoulder portions defined upon the lens members between the arcuate shaped portions and the adjacent portions of the frames, and said shoulders being adapted for reception within the channels of the offset portions.

In testimony whereof I affix my signature.

ALFRED J. SCHWARTZ.